United States Patent
Kim et al.

(10) Patent No.: US 9,956,951 B2
(45) Date of Patent: May 1, 2018

(54) METHOD AND APPARATUS FOR CONTROLLING COLD STARTING OF MILD HYBRID VEHICLE

(71) Applicant: Hyundai Motor Company, Seoul (KR)

(72) Inventors: Hyun Kim, Hwaseong-si (KR); Ki-Hong Kang, Gwangmyeong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/366,462

(22) Filed: Dec. 1, 2016

(65) Prior Publication Data

US 2018/0056972 A1    Mar. 1, 2018

(30) Foreign Application Priority Data

Sep. 1, 2016  (KR) .................. 10-2016-0112353

(51) Int. Cl.
 *B60W 20/00* (2016.01)
 *B60K 6/26* (2007.10)

(52) U.S. Cl.
 CPC ............... *B60W 20/00* (2013.01); *B60K 6/26* (2013.01); *B60K 2006/268* (2013.01); *B60W 2510/0676* (2013.01); *B60W 2710/06* (2013.01); *B60Y 2200/92* (2013.01); *B60Y 2300/194* (2013.01); *Y10S 903/906* (2013.01)

(58) Field of Classification Search
 CPC ............ B60W 20/00; B60W 2710/06; B60W 2510/0676; B60K 6/26; B60K 2006/268; B60Y 2300/194; B60Y 2200/92; Y10S 903/906
 See application file for complete search history.

(56) References Cited

U.S. PATENT DOCUMENTS

| 6,018,199 A | 1/2000 | Shiroyama et al. |
| 2010/0236851 A1* | 9/2010 | Van Maanen ......... B60L 3/0046 180/65.265 |
| 2015/0226171 A1 | 8/2015 | Kees et al. |

FOREIGN PATENT DOCUMENTS

| JP | H11-082259 A | 3/1999 |
| JP | 2001-0112116 A | 4/2001 |
| JP | 4421567 B | 12/2009 |
| JP | 2016-0107650 A | 6/2016 |

* cited by examiner

*Primary Examiner* — Rodney A Butler
(74) *Attorney, Agent, or Firm* — Brinks Gilson & Lione

(57) ABSTRACT

An apparatus and method for controlling cold starting of a mild hybrid vehicle, are disclosed. The method includes: measuring, by a sensor, a cooling water temperature of the vehicle when a request is received to start an engine; operating, by a controller, a starter to drive an engine when the cooling water temperature is less than a preset reference temperature, and stopping the operation of the starter and operating an MHSG to drive the engine when RPM of the engine driven by the starter exceeds a preset reference value. In particular, stepwise starting according to the cold starting of the vehicle is performed. The apparatus and the method are advantageous in that a starter and alternator are simultaneously controlled under a cold starting condition to provide startability and reduce capacity of a starter, reducing manufacturing costs.

6 Claims, 3 Drawing Sheets

METHOD AND APPARATUS FOR CONTROLLING COLD STARTING OF MILD HYBRID VEHICLE

CROSS-REFERENCE TO RELATED APPLICATION

This application claims priority to and the benefit of Korean Patent Application No. 10-2016-0112353, filed on Sep. 1, 2016, which is incorporated herein by reference in its entirety.

FIELD

The present disclosure relates to a method and apparatus for controlling cold starting of a mild hybrid vehicle.

BACKGROUND

The statements in this section merely provide background information related to the present disclosure and may not constitute prior art.

In general, a hybrid vehicle is a future type vehicle that is driven via a combination of an engine and a motor and is classified into a parallel-type car, a serial-type car, a combination-type car, and so on, according to a driving method. A hybrid vehicle may also be classified into a mild-type car, a middle-type car, and a hard-type car according to a power division ratio of the engine and the driving motor. The hard-type car has a driving motor with high capacity compared with an engine, the mild-type car has a driving motor with low capacity compared with an engine, and the present disclosure relates to a mild hybrid system.

In particular, a mild hybrid system refers to a system that does not have a driving mode in which a vehicle is driven by a driving motor only but supplies torque desired for driving using a hybrid starter generator (HSG) with fast response compared with an engine in order to instantly gain high torque during acceleration in a stop state of a vehicle or outstrip acceleration in a driving state.

In this regard, Korean Patent No. 10-1592828 (Control Method of Hybrid Vehicle) discloses a control method of a hybrid vehicle at the time of starting by an HSG only and, in detail, a control method of a hybrid vehicle in which a driving motor is connected between an engine and a transmission, the engine and the driving motor are connected through an engine clutch, and an HSG is connected to the engine.

However, the cited reference discloses a technology for determining a battery SOC state and, thus, when an engine is driven under a starting condition of a 48 V HSG, there is a limit in terms of Mild Hybrid Starter Generator (hereinafter termed "MHSG") efficiency and belt slip

SUMMARY

Therefore, the present disclosure addresses the above problems of the related art, and provides a method and apparatus for controlling cold starting for overcoming a limit in terms of MHSG efficiency and belt slip in a 48 V mild hybrid system.

The present disclosure provides a method of controlling cold starting of a mild hybrid vehicle, the method including: measuring, by a sensor, a cooling water temperature of the vehicle when an engine starting is requested; operating, by a controller, a starter configured to drive an engine when the cooling water temperature is less than a preset reference temperature; and stopping, by the controller, the operation of the starter and operating an MHSG to drive the engine when RPM of the engine driven by the starter exceeds a preset reference value, wherein stepwise starting according to the cold starting of the vehicle is performed.

The operating of the starter may further include driving the engine by the MHSG when the cooling water temperature is greater than or equal to the reference temperature.

The stopping of the operation of the starter may include operating the starter until the RPM of the engine reaches the preset reference value.

The preset reference value may be in the range of approximately 200 to 300 rpm corresponding to initial driving of the engine.

The preset reference temperature and the preset reference value may be resettable according to a state of the vehicle.

The present disclosure provides an apparatus for controlling cold starting of a mild hybrid vehicle, the apparatus including: a sensor configured to measure a cooling water temperature of the vehicle when an engine starting is requested; a starter configured to drive an engine when the cooling water temperature is less than a preset reference temperature; and an MHSG configured to stop an operation of the starter and to drive the engine when RPM of the engine driven by the starter exceeds a preset reference value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
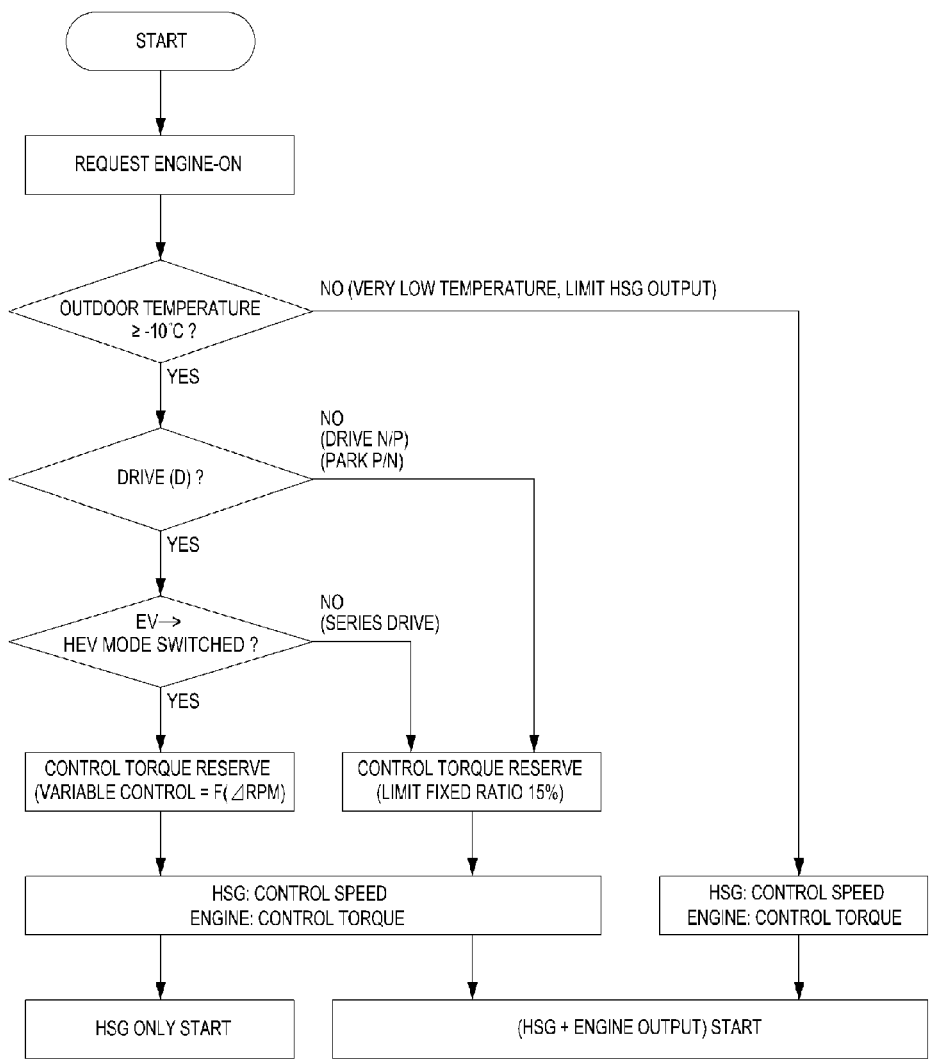
FIG. 1 is a flow chart illustrating a control technology of starting of a conventional hybrid vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The objectives and advantages of forms of the present disclosure will be understood and more obvious with reference to the following description and are not limited to the following description. In the description of the present disclosure, certain detailed explanations of the related art are omitted when it is deemed that they may unnecessarily obscure the essence of the present disclosure.

FIG. 1 is a flow chart illustrating a control technology of starting of a conventional hybrid vehicle. Referring to FIG. 1, upon receiving a request for engine 60-on, a hybrid controller (HCU) may determine whether an outdoor temperature is greater than or equal to a reference temperature (e.g., approximately −10° C.), determine whether the vehicle is driving while a transmission gear is positioned in "D" for drive if the outdoor temperature is greater than or equal to approximately −10° C., i.e., if a current state is not a condition that restricts HSG output based on the determination result. And the HCU determines whether a current mode is being switched to an HEV mode from an EV mode if the vehicle is driving while the transmission gear is positioned in the driving state based on the determination result.

When the current mode is being switched to an HEV mode from an EV mode, the hybrid controller may variably control HSG torque reserve according to a speed difference between an engine 60 and a motor. More specifically, when the transmission gear is positioned in "D" for drive and the current is switched to an HEV mode while the vehicle is driving in an EV mode, the hybrid controller may variably control the HSG torque reserve according to a speed difference between the engine 60 and the motor during a speed stabilization control period (engine fuel injection on/operation period) corresponding to a period just before engine clutch engagement after engine cranking. Here, the hybrid controller may preset and store a map with a speed difference between the engine 60 and the motor as an input value and HSG torque reserve as an output value and acquire the HSG torque reserve according to a speed difference between the engine 60 and the motor from the map while variably controlling the HSG torque reserve.

During variable control of the HSG torque reserve, an HSG may be controlled using a speed control method, the engine 60 may be controlled using a torque control method, and the HSG alone may control engine 60 starting so as to provide an equivalent level of starting response to a conventional case (engine 60 starting using HSG output and engine 60 output). In addition, based on the determination result, when the vehicle is driving while the transmission gear is not positioned in "D" for drive, i.e., when the transmission gear is positioned in "N" for neutral or R for reverse or when the vehicle is parked while the transmission gear is positioned in "P" for park or "N" for neutral, the hybrid control may restrictedly control the HSG torque reserve to a fixed rate (e.g., approximately 15%). In this case, the HSG may be controlled using a speed control method, the engine 60 may be controlled using a torque control method, and engine 60 starting may be controlled using HSG output and engine 60 output.

Based on the determination result, when the EV mode is not switched to the HEV mode during driving, that is, in the case of series driving, the HSG torque reserve may be restrictedly controlled. In this case, the HSG may be controlled using a speed control method, the engine 60 may be controlled using a torque control method, and engine 60 starting may be controlled using HSG output and engine 60 output. In addition, as the above determination result, when an outdoor temperature is equal to or less than approximately −10° C., there is a limit in HSG output and, thus, engine 60 output as a subject for engine 60 speed control may maintain HSG output torque at a constant value.

However, we have discovered that the conventional technology is a starting control technology in a system in which a driving motor is connected between an engine 60 and a transmission and differentiates a starting mode in consideration of only an outdoor temperature and a driving condition. Accordingly, when an engine 60 is driven under a starting condition of a 48 V starter generator, there is a limit with regard to MHSG 50 efficiency and belt slip.

Figure 2:
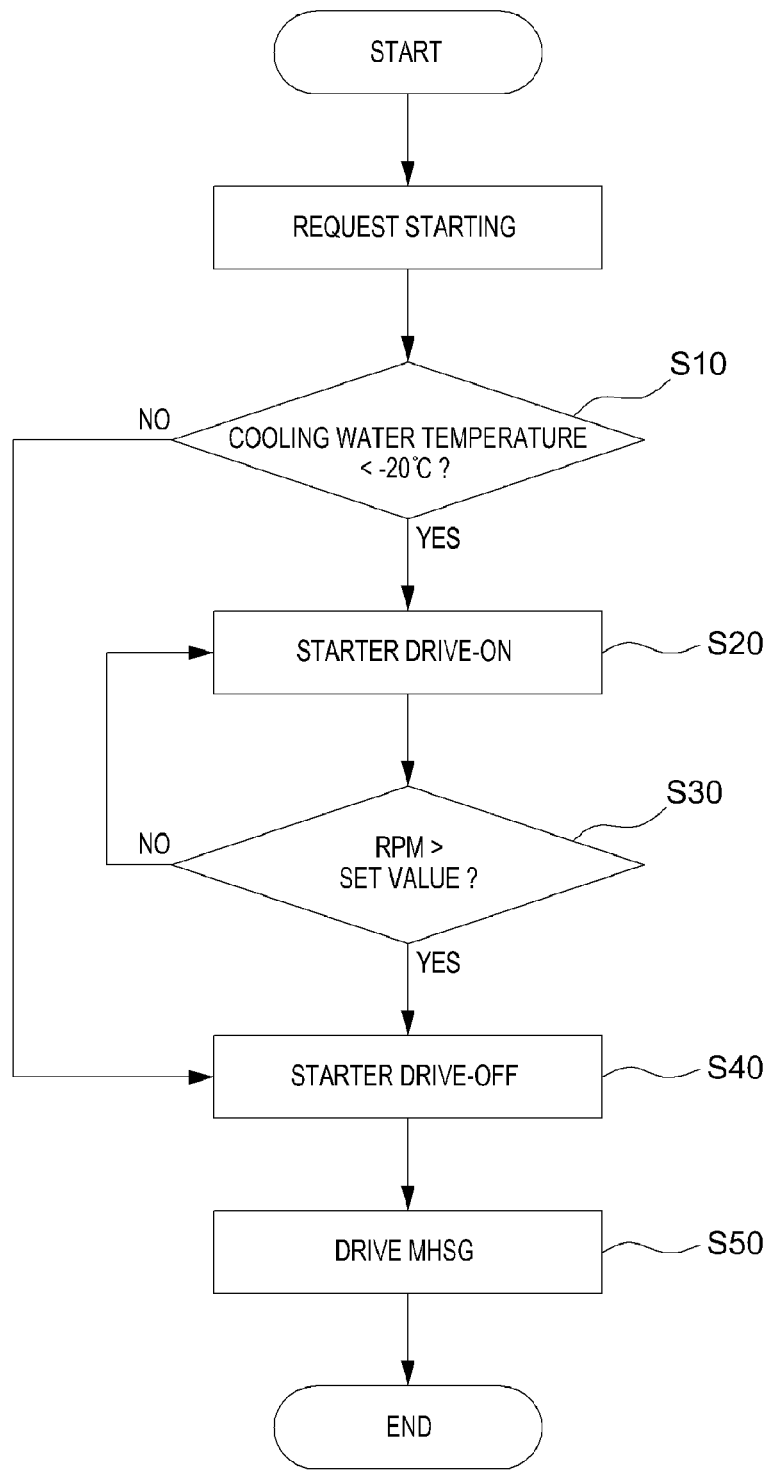
FIG. 2 is a flow chart illustrating a control technology of starting of a 48 V mild hybrid system according to one form of the present disclosure.
Figure 3:
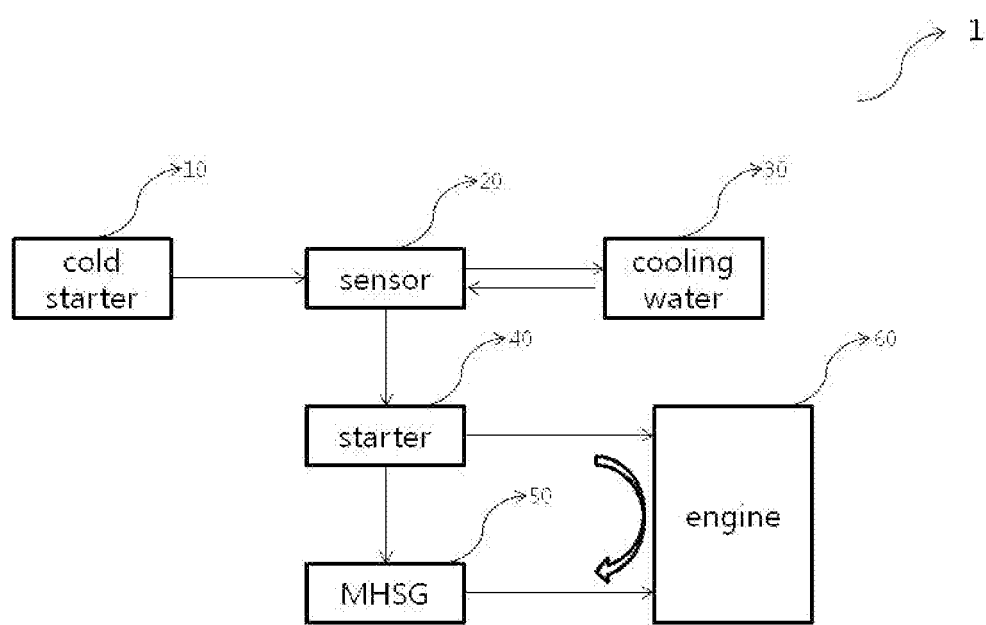
FIG. 3 is an apparatus for controlling cold starting of a mild hybrid vehicle according to one form of the present disclosure.

FIG. 2 is a diagram illustrating a control technology of starting of a 48 V mild hybrid system according to one form of the present disclosure. Referring to FIG. 2, a control method of starting of a hybrid vehicle may include: a first operation step S10 of measuring a cooling water 30 temperature of a vehicle when starting is desired and of determining whether the measured cooling water 30 temperature is lower than a preset temperature (e.g., approximately −20° C.); a second operation step S20 of operating a starter to drive an engine 60 when the cooling water 30 temperature is lower than the preset reference temperature; a third operation step S30 of determining whether RPM of the engine 60 exceeds a preset reference value; a fourth step S40 of stopping the operation of the starter when the RPM of the engine 60 exceeds the preset reference value; and step S50 of operating an MHSG 50 to drive the engine 60. In addition, stepwise starting according to cold starting of a vehicle may be realized.

In the first operation S10, when starting is desired, a cooling water 30 temperature may be measured. When a driver attempts to turn on the vehicle, the cooling water 30 temperature may be measured in order to determine whether a current state is a cold starting state.

A cooling water 30 temperature sensor 20 may also be referred to as a water temperature sensor 20 and referred to as a water temperature sensor 20 (WTS) or an engine 60 coolant temperature sensor 20 (ECTS). Mostly, the cooling water 30 temperature sensor 20 may be installed in a path of cooling water 30 of a cylinder block or a cylinder head so as to measure a cooling water 30 temperature. The cooling water 30 temperature sensor 20 may be an NTC thermistor and the NTC thermistor has properties whereby a resistance value is reduced as a temperature increases and, thus may be used to measure a temperature.

In the second operation S20, when the cooling water 30 temperature is less than a preset reference temperature, the starter is operated to drive the engine 60. The second operation further includes driving the engine 60 by the MHSG 50 when the cooling water 30 temperature is greater than or equal to a reference temperature.

In forms of the present disclosure, the reference temperature may be set to approximately −20° C. and reset according to the type and environment of a vehicle. When the reference temperature is less than approximately −20° C., a current operation is determined to be a cold starting operation and the starter may be operated to drive the engine 60.

Since it is difficult to drive the engine 60 simply by driving a belt due to excessive friction of the engine 60 during cold starting, the engine 60 is driven by the starter and, in this regard, a capacity of the starter needs to be increased compared with a normal case in order to completely drive the engine 60 by the starter. The engine 60 may be driven by the starter up to an initial RPM or less (S30) and, then, driving of the starter may be stopped (S40).

When it is determined that cold starting is performed, and a current temperature is a temperature for starting by an MHSG 50, but starting by the MHSG 50 is not possible, the engine 60 may be driven using a driving motor of the starter.

A hybrid vehicle may be largely classified into a mild hybrid vehicle and a plug-in hybrid vehicle according to a charging method. The mild hybrid vehicle recharges a battery using a portion of energy generated by an internal combustion engine 60, and the plug-in hybrid vehicle recharges a battery using energy received from an external commercially available power source.

In particular, a mild hybrid system refers to a system that does not have a driving mode in which a vehicle is driven by a driving motor only but supplies torque desired for driving using a hybrid starter generator (HSG) with fast response compared with an engine 60 in order to instantly gain high torque during acceleration in a stop state of a vehicle or outstrip acceleration in a driving state.

A mild hybrid vehicle may include an engine 60, a starter for idle stop and go, an HSG having a generation function for recharging a battery, an HCU as a controller for control of drive of the HSG, a battery for recharging with electricity generated by the HSG to supply power to a plurality of electric components (e.g., a cooling fan), and so on.

The engine 60 and the HSG may be connected so as to transmit power using a pulley and a belt as a medium. Accordingly, the HSG may be driven to turn on the engine 60 during engine 60 starting, the vehicle may be driven with power according to single driving and, simultaneously, the HSG may generate remaining power from the engine 60 and store electrical energy in the battery.

In the operation step S50, when the engine 60 is driven by the starter and RPM of the engine 60 is greater than a preset reference value, the operation of the starter may be stopped and the MHSG 50 may be operated to drive the engine 60. When the RPM is equal to or less than a reference value, the starter may be operated until the RPM reaches the reference value.

The reference value may be in the range of approximately 200 to 300 corresponding to initial driving of the engine 60 in the step S30, the reference value may be changed according to a state of the vehicle. The reference value may be changed according to specifications of the engine 60 and components of the corresponding vehicle and differently determined according to previous experiments, appropriate interpretation, and so on. That is, the reference temperature and the reference value may be reset according to a state of the vehicle.

Hereinafter, a cold starting control apparatus of a mild hybrid vehicle using the aforementioned method will be described. The cold starting control apparatus of the mild hybrid vehicle may include a sensor 20, a starter, and an MHSG 50.

The sensor 20 may measure a cooling water 30 temperature of a vehicle when starting is desired. The sensor 20 may be a cooling water 30 temperature sensor 20 and may be referred to as a water temperature sensor 20 (WTS) or an engine 60 coolant temperature sensor 20 (ECTS), as described above with regard to the description of the control method. Similarly, mostly, the sensor 20 may be installed in a path of cooling water 30 of a cylinder block or a cylinder head so as to measure a cooling water 30 temperature.

The starter may drive the engine 60 when the cooling water 30 temperature is less than a preset reference temperature. In addition, the MHSG 50 may operates when the starter drives the engine 60 and RPM of the engine 60 exceeds a preset reference value. In this case, the operation of the starter may be stopped and the MHSG 50 may operate the engine 60. A repeated explanation of each component among the aforementioned components will not be given.

The present disclosure has an advantage in that a starter and an alternator are simultaneously controlled under a cold starting condition so as to provide startability in cold start condition.

In addition, the present disclosure also provides a control method for reducing manufacturing costs via reduction in capacity of a starter.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A method of controlling cold starting of a mild hybrid vehicle, the method comprising: measuring, by a sensor, a cooling water temperature of the vehicle when a request is received to start an engine; operating, by a controller, a starter configured to drive an engine when the cooling water temperature is less than a preset reference temperature; and stopping, by the controller, the operation of the starter and operating a Mild Hybrid Starter Generator configured to drive the engine when RPM of the engine driven by the starter exceeds a preset reference value, wherein stepwise starting according to the cold starting of the vehicle is performed.

2. The method according to claim 1, wherein the operating of the starter further comprises driving the engine by the Mild Hybrid Starter Generator when the cooling water temperature is greater than or equal to the reference temperature.

3. The method according to claim 1, wherein the stopping of the operation of the starter comprises operating the starter until the RPM of the engine reaches the preset reference value.

4. The method according to claim 3, wherein the preset reference value is in a range of approximately 200 to 300 rpm corresponding to initial driving of the engine.

5. The method according to claim 1, wherein the preset reference temperature and the preset reference value are resettable according to a state of the vehicle.

6. An apparatus for controlling cold starting of a mild hybrid vehicle, the apparatus comprising: a sensor configured to measure a cooling water temperature of the vehicle when a request is received to start an engine; a starter configured to drive an engine when the cooling water temperature is less than a preset reference temperature; and a Mild Hybrid Starter Generator configured to stop an operation of the starter and to drive the engine when RPM of the engine driven by the starter exceeds a preset reference value.

* * * * *